US006932484B2

(12) United States Patent
Brandt et al.

(10) Patent No.: US 6,932,484 B2
(45) Date of Patent: Aug. 23, 2005

(54) REAR VIEW MIRROR ASSEMBLY

(75) Inventors: Dale E. Brandt, 2788 Jackson Dr., Jackson, WI (US) 53037; Leo Spychalla, Watertown, WI (US)

(73) Assignee: Dale E. Brandt, Jackson, WI (US)

( * ) Notice: Subject to any disclaimer, the term of this patent is extended or adjusted under 35 U.S.C. 154(b) by 74 days.

(21) Appl. No.: 10/672,322

(22) Filed: Sep. 26, 2003

(65) Prior Publication Data

US 2005/0068647 A1 Mar. 31, 2005

(51) Int. Cl.$^7$ .......................... G02B 5/08; G02B 7/182; B60R 1/04
(52) U.S. Cl. ........................ 359/865; 359/872; 359/873; 248/478; 248/479
(58) Field of Search .................... 359/605, 606, 359/607, 841, 850, 854, 855, 864, 865, 872, 873, 881; 248/478, 479, 480, 486

(56) References Cited

U.S. PATENT DOCUMENTS

| | | | | |
|---|---|---|---|---|
| 361,386 A | * | 4/1887 | Wiederer | ..................... 359/854 |
| 2,279,751 A | | 4/1942 | Hensley | |
| 2,307,532 A | * | 1/1943 | Murphy | ..................... 359/607 |
| 2,320,904 A | | 6/1943 | Bachkai | |
| 2,582,651 A | | 1/1952 | Peterson | |
| 2,741,156 A | * | 4/1956 | Barkley | ..................... 359/607 |
| 2,802,394 A | | 8/1957 | Krone | |
| 2,821,115 A | * | 1/1958 | Weinrich et al. | ............ 359/607 |
| 2,857,810 A | | 10/1958 | Troendle | |
| 3,145,257 A | | 8/1964 | Suga | |
| 3,180,219 A | | 4/1965 | Ruiz et al. | |
| 3,389,952 A | | 6/1968 | Tobin, Jr. | |
| 3,480,350 A | * | 11/1969 | Hamby | ..................... 359/854 |
| 3,712,715 A | | 1/1973 | Wagner | |
| 3,826,563 A | | 7/1974 | Davis | |
| 4,019,812 A | * | 4/1977 | Carnine | ..................... 359/854 |
| 4,331,382 A | | 5/1982 | Graff | |
| 4,394,065 A | * | 7/1983 | Swanson | ..................... 359/844 |
| 4,482,210 A | | 11/1984 | Brookman | |
| 4,487,479 A | * | 12/1984 | Tolomeo, Sr. | ............... 359/854 |
| 4,643,544 A | | 2/1987 | Loughran | |
| 4,674,850 A | | 6/1987 | Blom | |
| 4,695,138 A | | 9/1987 | Epstein | |
| 4,718,756 A | | 1/1988 | Lancaster | |
| 4,832,476 A | | 5/1989 | Gabrielyan | |
| 4,859,046 A | | 8/1989 | Traynor et al. | |
| 4,907,871 A | | 3/1990 | Hou | |
| 4,927,255 A | * | 5/1990 | Martinez | ..................... 359/855 |
| 4,998,812 A | | 3/1991 | Hou | |
| 5,052,792 A | * | 10/1991 | McDonough | ............... 359/843 |
| 5,153,781 A | | 10/1992 | Brandt | |
| 5,295,021 A | | 3/1994 | Swanson | |
| 5,479,297 A | * | 12/1995 | Summers | ..................... 359/841 |
| 5,517,367 A | | 5/1996 | Kim et al. | |
| 5,579,133 A | | 11/1996 | Black et al. | |
| 5,625,500 A | * | 4/1997 | Ackerman | .................. 359/841 |
| 5,691,855 A | | 11/1997 | Lupkas | |

(Continued)

Primary Examiner—Ricky D. Shafer
(74) Attorney, Agent, or Firm—Michael Best & Friedrich LLP

(57) ABSTRACT

A rear view mirror assembly comprising a frame and a mirror supported by the frame. The mirror includes a first mirror section and a second mirror section pivotally coupled to the first mirror section. A screw drive is supported by the frame for rotation relative to the frame, and has a first threaded surface. An arm has an inner arm end supported by the screw drive and extends outwardly from the screw drive to an outer arm end. The inner arm end has a second threaded surface that engages the first threaded surface. The outer arm end supports the second mirror section. An arm cam projects from the outer arm end away from the second mirror section and defines a first cam surface. A frame cam projects from the frame toward the second mirror section and defines a second cam surface contacting the first cam surface.

9 Claims, 4 Drawing Sheets

U.S. PATENT DOCUMENTS

| | | |
|---|---|---|
| 5,793,542 A | 8/1998 | Kondo et al. |
| D397,658 S | 9/1998 | Kim et al. |
| D403,286 S | 12/1998 | Kim et al. |
| D403,287 S | 12/1998 | Kim et al. |
| D409,127 S | 5/1999 | Kim et al. |
| 5,946,150 A | 8/1999 | Liao |
| 6,126,289 A | 10/2000 | Nagayama |
| 6,199,993 B1 | 3/2001 | Mou |
| 6,398,377 B1 | 6/2002 | Chou |
| 6,439,729 B2 | 8/2002 | Koukichi |
| 6,527,399 B1 | 3/2003 | Palathingal |

\* cited by examiner

REAR VIEW MIRROR ASSEMBLY

FIELD OF THE INVENTION

This invention relates to a rear view mirror assembly for a vehicle.

BACKGROUND OF THE INVENTION

Automobiles generally have rear view mirrors to provide the operator a view of the surroundings behind the automobile. Rear view mirrors are often useful to view traffic approaching from behind the automobile while driving on a road. An automobile usually has exterior rear view mirrors near the driver side and the passenger side, and an interior rear view mounted near the center of the windshield. In most vehicles, a blind spot exists between the range of view of the passenger side exterior rear view mirror and the interior rear view mirror. An object or vehicle in the blind spot may not be visible in any of the rear view mirrors and may pose problems when changing lanes.

SUMMARY OF THE INVENTION

The present invention provides a rear view mirror assembly comprising a frame and a mirror supported by the frame. The mirror includes a first mirror section and a second mirror section pivotally coupled to the first mirror section to pivot relative to the first mirror section and the frame. The second mirror section includes an inner mirror portion adjacent the first mirror section and an outer mirror portion positioned opposite the inner mirror portion. A screw drive is supported by the frame for rotation relative to the frame, and has a first threaded surface.

An arm has an inner arm end supported by the screw drive and extends outwardly from the screw drive to an outer arm end. The inner arm end has a second threaded surface that engages the first threaded surface of the screw drive. The outer arm end is connected to the second mirror section and supports the outer mirror portion of the second mirror section. An arm cam projects rearwardly from the outer arm end away and from the second mirror section. The arm cam defines a first cam surface. A frame cam projects forwardly from the frame and toward the second mirror section. The frame cam defines a second cam surface that contacts the first cam surface.

The screw drive includes a knob that may be manually rotated to rotate the screw drive. The first threaded surface engages the second threaded surface as the screw drive rotates, and the arm moves in a translational direction in response to rotational movement of the screw drive. The first cam surface engages the second cam surface as the arm moves in a translational direction, and the cam surfaces pivot the arm about the screw drive in response to the translational movement of the arm. Since the second mirror section is connected to the arm, the second mirror section also pivots in response to the pivotal movement of the arm.

Independent features and independent advantages of the present invention will become apparent to those skilled in the art upon review of the following detailed description, claims and drawings.

Figure 1:
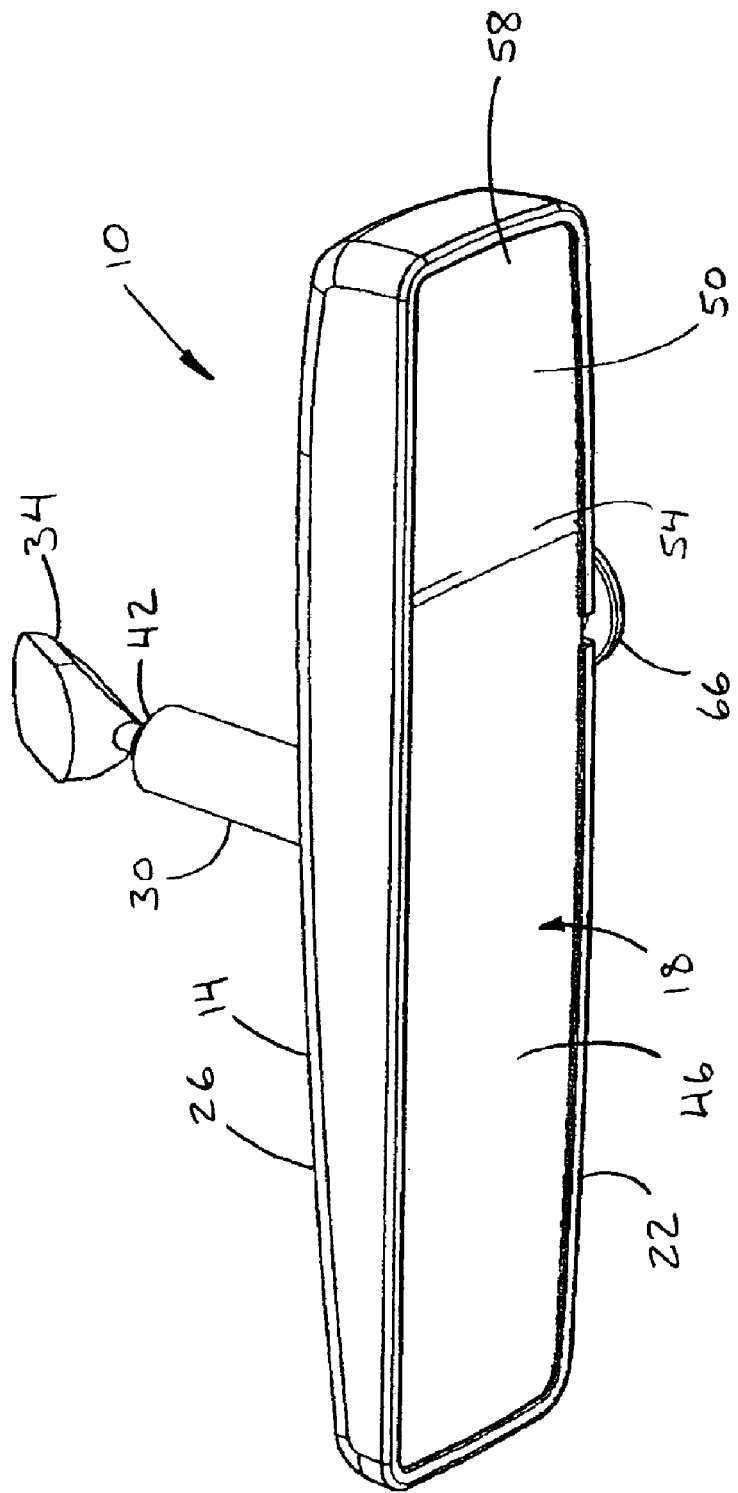
FIG. 1 is a perspective view of a rear view mirror assembly embodying aspects of the invention.

Before any embodiments of the invention are explained in detail, it is to be understood that the invention is not limited in its application to the details of construction and the arrangements of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting.

Although references may be made below to directions, such as left, right, up, down, top, bottom, front, rear, back, etc., in describing the drawings, these references are made relative to the drawings (as normally viewed) for convenience. These directions are not intended to be taken literally or limit the present invention in any form.

DETAILED DESCRIPTION

FIG. 1 illustrates a rear view mirror assembly 10 comprising a frame or housing 14 and a mirror 18 supported by the housing 14. The rear view mirror assembly 10 may be mounted to the windshield on the inside of an automobile for use while operating the automobile. The mirror 18 includes a reflective surface that faces outwardly from the housing 14 and permits the driver to view images of objects behind the automobile. In the illustrated construction, the frame includes a housing 14 having a forward portion 22 and a rearward portion 26 opposite the forward portion 22. As shown in FIG. 1, the mirror 18 is exposed adjacent the forward portion 22, and a post 30 projects outwardly from the rearward portion 26. The post 30 may be connected to a mounting portion 34 with a ball-and-socket swivel joint 42. The mounting portion 34 may be rigidly mounted to the interior surface of the automobile windshield. The swivel joint 42 provides a wide range of motion and the socket frictionally engages the ball to maintain the mirror 18 in the desired position relative to the windshield. The rear view mirror assembly 10 may also include a tilt mechanism to tilt the mirror 18 for nighttime driving.

The mirror 18 includes a first mirror section 46 and a second mirror section 50 separated by a vertical line or edge. In the illustrated construction, the first mirror section 46 is fixed relative to the housing 14, and the second mirror section 50 is pivotally coupled to the first mirror section 46 to pivot relative to the first mirror section 46 and the housing 14. The second mirror section 50 includes an inner mirror portion 54 adjacent the first mirror section 46 and an outer mirror portion 58 positioned opposite the inner mirror portion 54.

Figure 2:
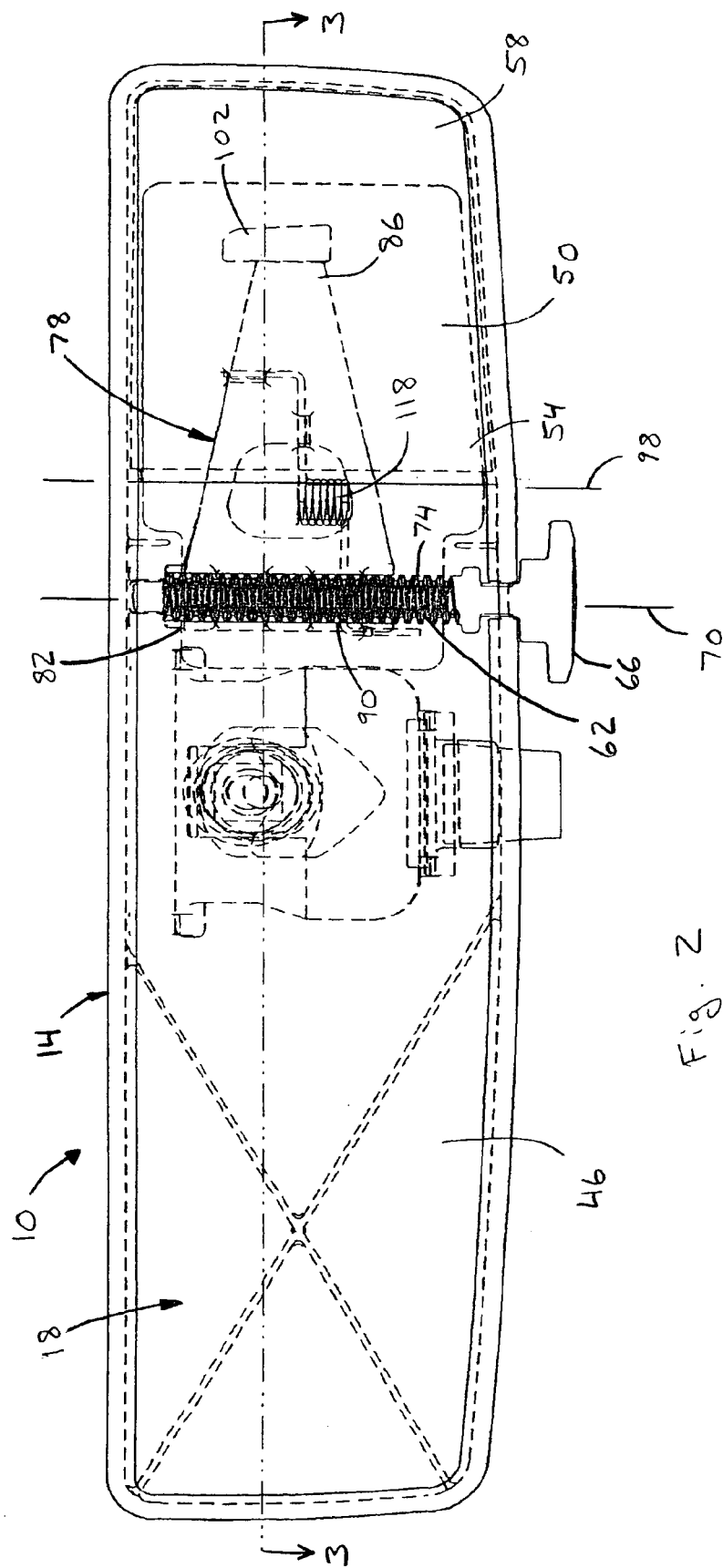
FIG. 2 is a cross-sectional elevation view of the rear view mirror assembly of FIG. 1.

The rear view mirror assembly 10 includes an adjustment mechanism to adjust the position of the second mirror section 50 relative to the first mirror section 46. As shown in FIG. 2, the rear view mirror assembly 10 includes a screw drive 62 supported by the housing 14 for rotation relative to the housing 14. The screw drive 62 includes a knob 66 extending out of the housing 14. The operator may engage the knob 66 to manually rotate screw drive 62 and adjust the position of the second mirror section 50. In the illustrated construction, the knob 66 extends below the housing 14. The knob 66 is easily accessible for the operator and does not obstruct the line of sight of the operator when viewing the mirror 18.

The screw drive 62 rotates about a rotational axis 70 and includes a first threaded surface 74. An arm 78 is disposed within the housing 14 and includes an inner arm end 82 supported by the screw drive 62 and an outer arm end 86 disposed opposite the inner arm end 82. The arm 78 extends outwardly from the inner arm end 82 toward the outer arm end 86. The inner arm end 82 includes a second threaded surface 90 that engages the first threaded surface 74 of the screw drive 62. The arm 78 moves in a generally translational direction in response to rotational movement of the screw drive 62.

Figure 3:
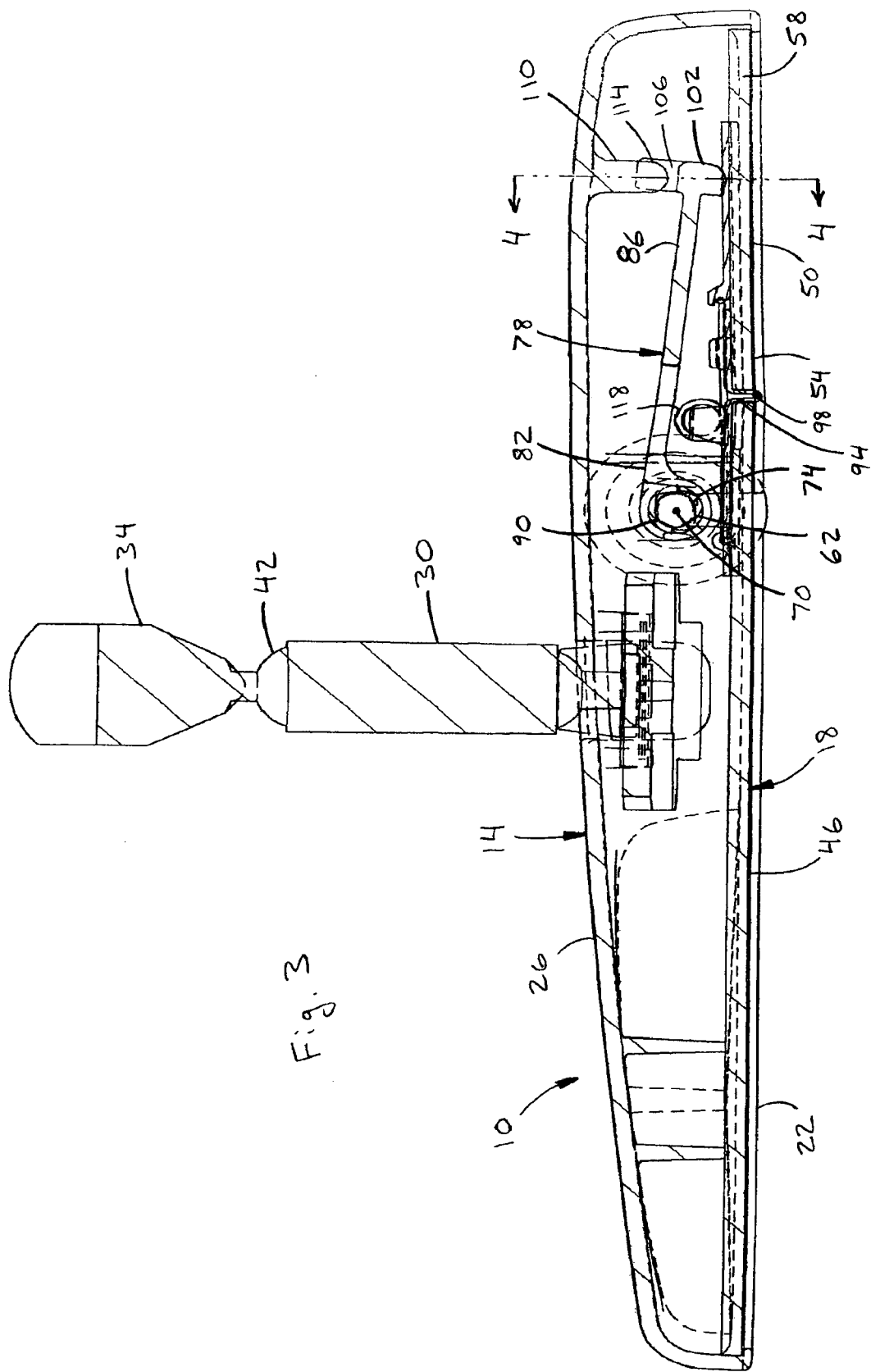
FIG. 3 is a cross-sectional top view of the rear view mirror assembly of FIG. 2, taken along line 3—3.

As shown in FIG. 3, the second threaded surface 90 is generally cylindrical and at least partially surrounds the first threaded surface 74. The outer arm end 86 of the arm 78 is connected to the second mirror section 50 and supports the outer mirror portion 58 of the second mirror section 50. The left vertical edge of the second mirror section 50 is pivotally connected to a vertical edge of the first mirror section 46 with a hinge 94. In the illustrated construction, the hinge 94 is made from a flexible material and provides a discernable visible break or linear gap between the first mirror section 46 and the second mirror section. The second mirror section 50 pivots relative to the first mirror section about a pivot axis 98. In the illustrated construction, the pivot axis 98 is substantially parallel to the rotational axis 70. The break between the first and second mirror sections 46, 50 helps the operator visually separate which images are from which section of the mirror 18.

The arm 78 includes an arm cam 102 projecting from the outer arm end 86 away from the second mirror section 50, and defining a first cam surface 106. In some constructions, the cam 102 may be directly fixed to the second mirror section 50. The housing 14 includes a housing cam 110 projecting from the interior of the housing 14 toward the second mirror section 50 adjacent the arm cam 102. The housing cam 110 defines a second cam surface 114 contacting the first cam surface 106.

Figure 4:
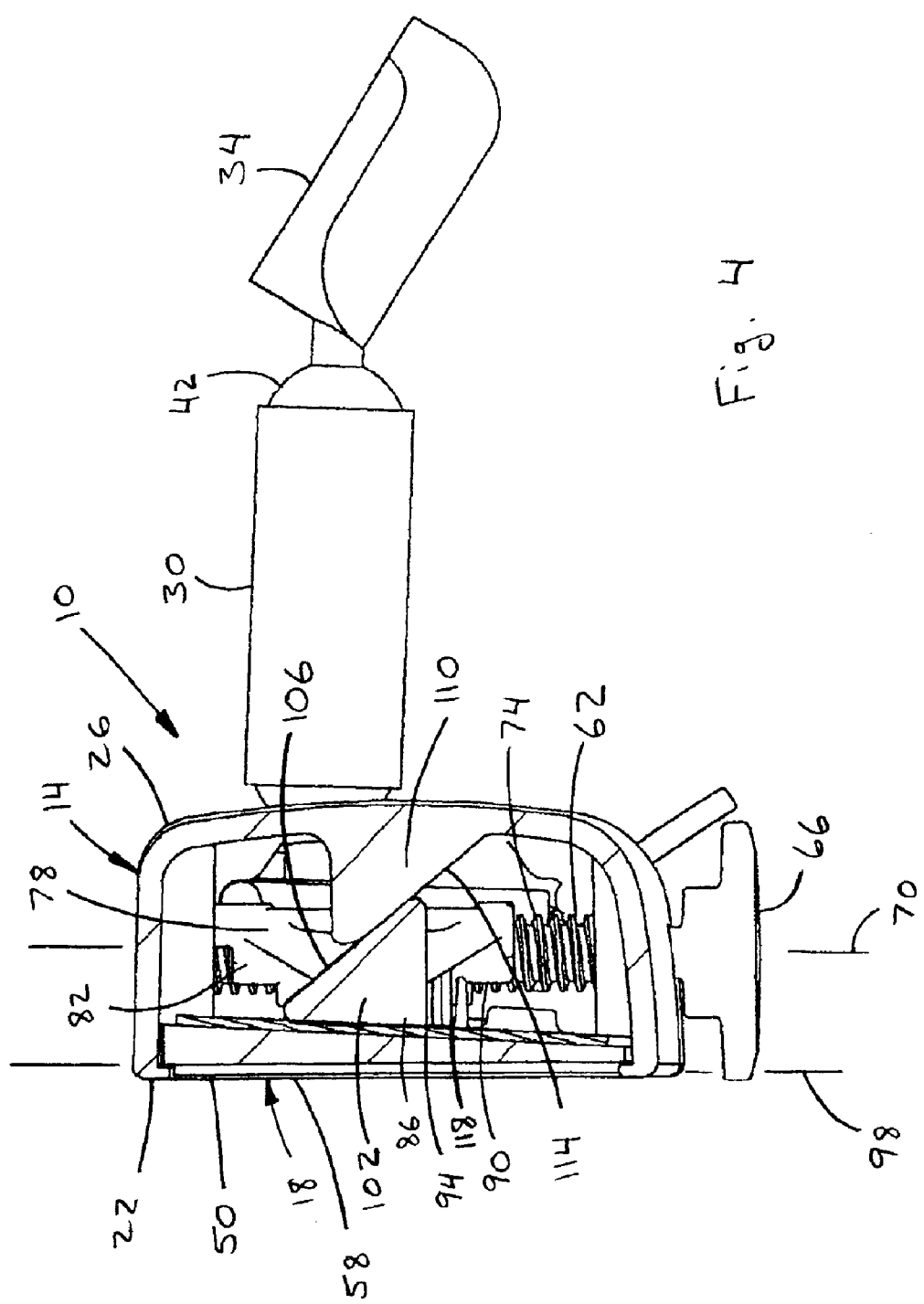
FIG. 4 is a cross-sectional elevation view of the rear view mirror assembly of FIG. 3, taken along line 4—4.

As shown in FIG. 4, the first cam surface 106 and the second cam surface 114 include opposed angled sliding surfaces that engage one another and extend rearwardly and downwardly with respect to the plane of the first mirror section. The first cam surface 106 and the second cam surface 114 are interconnected to slide against one another to adjust the position of the second mirror section 50 relative to the first mirror section 46 and the housing 14. More particularly, the second cam surface 114 is fixed to the housing 14 and the first cam surface 106 is fixed to the arm 78. As the arm cam 102 moves upwardly relative to the housing cam 110, the arm cam 102 also moves forwardly relative to the housing cam 110.

As shown in FIG. 3, the rear view mirror assembly 10 includes a biasing member 118 connected the second mirror section 50. In the illustrated construction, the biasing member 118 includes a torsion spring connected to both the first mirror section 46 and the second mirror section 50 adjacent the hinge 94. The biasing member 118 biases the second mirror portion 50 rearwardly such that the first cam surface 106 is biased toward the second cam surface 114.

In operation, the knob 66 is rotated to pivot the second mirror section 50 and adjust the position of the mirror 18. As shown in FIG. 2, an operator may manually rotate the knob 66 to rotate the screw drive 62 about the rotational axis 70. As the screw drive 62 rotates, the first threaded surface 74 engages the second threaded surface 90 to move the arm 78 in a translational direction in response to the rotational movement of the screw drive 62. For example, as shown in FIG. 2, the arm 78 may move upwardly in response to counter-clockwise rotation of the knob 66, and may move downwardly in response to clockwise rotation of the knob 66.

The outer arm end 86 is connected to the second mirror section 50, so the second mirror section 50 moves in response to movement of the arm 78. As shown in FIG. 3, the biasing member 118 biases the second mirror section 50 toward the housing cam 110. The outer arm end 86 contacts the second mirror section 50 and is therefore also biased toward the housing cam 110. As shown in FIG. 4, the biasing member 118 maintains contact between the first cam surface 106 and the second cam surface 114. As the arm 78 moves in a translational direction, the first cam surface 106 and the second cam surface 114 slide across one another to pivot the arm 78 about the screw drive 62. The cam 102 also slies against the back surface of the second mirror section 50. Pivotal movement of the arm 78 also pivots the second mirror section 50 because the outer arm end 86 contacts the second mirror section 50. The second mirror section 50 pivots about the pivot axis 98 relative to the first mirror section 46 and housing 14 in response to translational and pivotal movement of the arm 78.

In the illustrated construction, the first mirror section 46 remains relatively fixed relative to the housing 14. The second mirror section 50 may be pivoted relative to the first mirror section 46 and housing 14. The operator may adjust the position of the second mirror section 50 as desired to adjust the range of vision of the rear view mirror assembly 10. The construction of the first and second threaded surface 74, 90 and first and second cam surfaces 106, 114 of the rear view mirror assembly 10 provides greater control and permits relatively fine adjustments of the second mirror section 50.

The foregoing detailed description describes only a few of the many forms that the present invention can take, and should therefore be taken as illustrative rather than limiting. It is only the claims, including all equivalents that are intended to define the scope of the invention.

We claim:

1. A rear view mirror assembly comprising:
   a frame;
   a mirror supported by the frame and having a first mirror section and a second mirror section pivotally coupled to the first mirror section;
   a screw drive supported by the frame and having a first threaded surface;
   an arm having an inner arm end supported by the screw drive and extending outwardly to an outer arm end supporting the second mirror section, the inner arm end having a second threaded surface engaging the first threaded surface;
   an arm cam projecting from the outer arm end away from the second mirror section and defining a first cam surface; and
   a frame cam projecting from the frame toward the second mirror section and defining a second cam surface contacting the first cam surface.

2. The rear view mirror assembly of claim 1, further comprising a biasing member connected to the second mirror section and biasing the first cam surface toward the second cam surface.

3. The rear view mirror assembly of claim 2, wherein the biasing member includes a torsion spring biasing the second mirror section rearwardly.

4. The rear view mirror assembly of claim 1, wherein the screw drive includes a knob extending below the frame and out of the line of sight of the mirror.

5. The rear view mirror assembly of claim 1, wherein the screw drive rotates about a rotational axis and the second mirror section pivots about a pivot axis substantially parallel to the rotational axis.

6. The rear view mirror assembly of claim 1, further comprising a hinge pivotally coupling the first mirror section to the second mirror section.

7. The rear view mirror assembly of claim 1, wherein the arm moves in a translational direction in response to rotational movement of the screw drive.

8. The rear view mirror assembly of claim 1, wherein the second mirror section pivots relative to the first mirror section in response to translational movement of the arm.

9. The rear view mirror assembly of claim 1, wherein the position of the first mirror section is fixed relative to the frame.

* * * * *